(12) United States Patent
Moses et al.

(10) Patent No.: US 10,410,483 B2
(45) Date of Patent: Sep. 10, 2019

(54) SYSTEMS AND METHODS FOR INTERACTIVE EMERGENCY RESPONSE SYSTEMS

(71) Applicant: Honeywell International Inc., Morristown, NJ (US)

(72) Inventors: SatheeshBabu Moses, Madurai (IN); Viswanathan Krishnan, Bengaluru (IN); Manigandan Hutchigowder Palaniappan, Ooty (IN); Balaji Sambamoorthy, Madurai (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/843,570

(22) Filed: Dec. 15, 2017

(65) Prior Publication Data

US 2019/0188977 A1    Jun. 20, 2019

(51) Int. Cl.
G08B 1/08 (2006.01)
G08B 7/06 (2006.01)

(52) U.S. Cl.
CPC .................................. *G08B 7/066* (2013.01)

(58) Field of Classification Search
None
See application file for complete search history.

(56) References Cited

U.S. PATENT DOCUMENTS

| 9,383,426 B2 | 7/2016 | Mohamadi |
| 2009/0170468 A1 | 7/2009 | Kane et al. |
| 2010/0280836 A1 | 11/2010 | Lu et al. |
| 2011/0046920 A1* | 2/2011 | Amis ............ G01S 19/16 702/181 |
| 2011/0136463 A1 | 6/2011 | Ebdon et al. |
| 2013/0116922 A1 | 5/2013 | Cai et al. |

(Continued)

FOREIGN PATENT DOCUMENTS

| CN | 105547285 A | 5/2016 |
| EP | 3 062 297 A1 | 8/2016 |
| WO | 2017026111 A1 | 2/2017 |

OTHER PUBLICATIONS

English language translation of bibliographic data and abstract of CN105547285 (A).

(Continued)

*Primary Examiner* — Adolf Dsouza
(74) *Attorney, Agent, or Firm* — Brooks, Cameron & Huebsch, PLLC

(57) ABSTRACT

Systems and methods for interactive emergency response systems are provided. Some methods can include retrieving a building information model of a monitored region stored in a database device, receiving real time data related to an occupant in the monitored region, receiving real time ambient condition signals from a plurality of devices in the monitored region that identify current conditions in the monitored region, dynamically generating and updating an evacuation plan for the occupant from the monitored region based on the building information model, the real time data, and the real time ambient condition signals, and dynamically transmitting a notification of the evacuation plan as updated to a user device carried the occupant for use in exiting the monitored region and moving to a safe assembly area.

15 Claims, 1 Drawing Sheet

(56) References Cited

U.S. PATENT DOCUMENTS

2015/0137967 A1    5/2015  Wedig et al.
2015/0348220 A1*  12/2015  Sharma ............... G06Q 50/265
                                                           705/324

OTHER PUBLICATIONS

English language translation of abstract, description, and claims of CN105547285A.
Partial Search Report and Opinion from related European Patent Application No. 18192396, dated Mar. 8, 2019, 20 pages.
Extended Search Report and Written Opinion from related European Patent Application No. 18192396, dated Jun. 5, 2019, 22 pages.

* cited by examiner

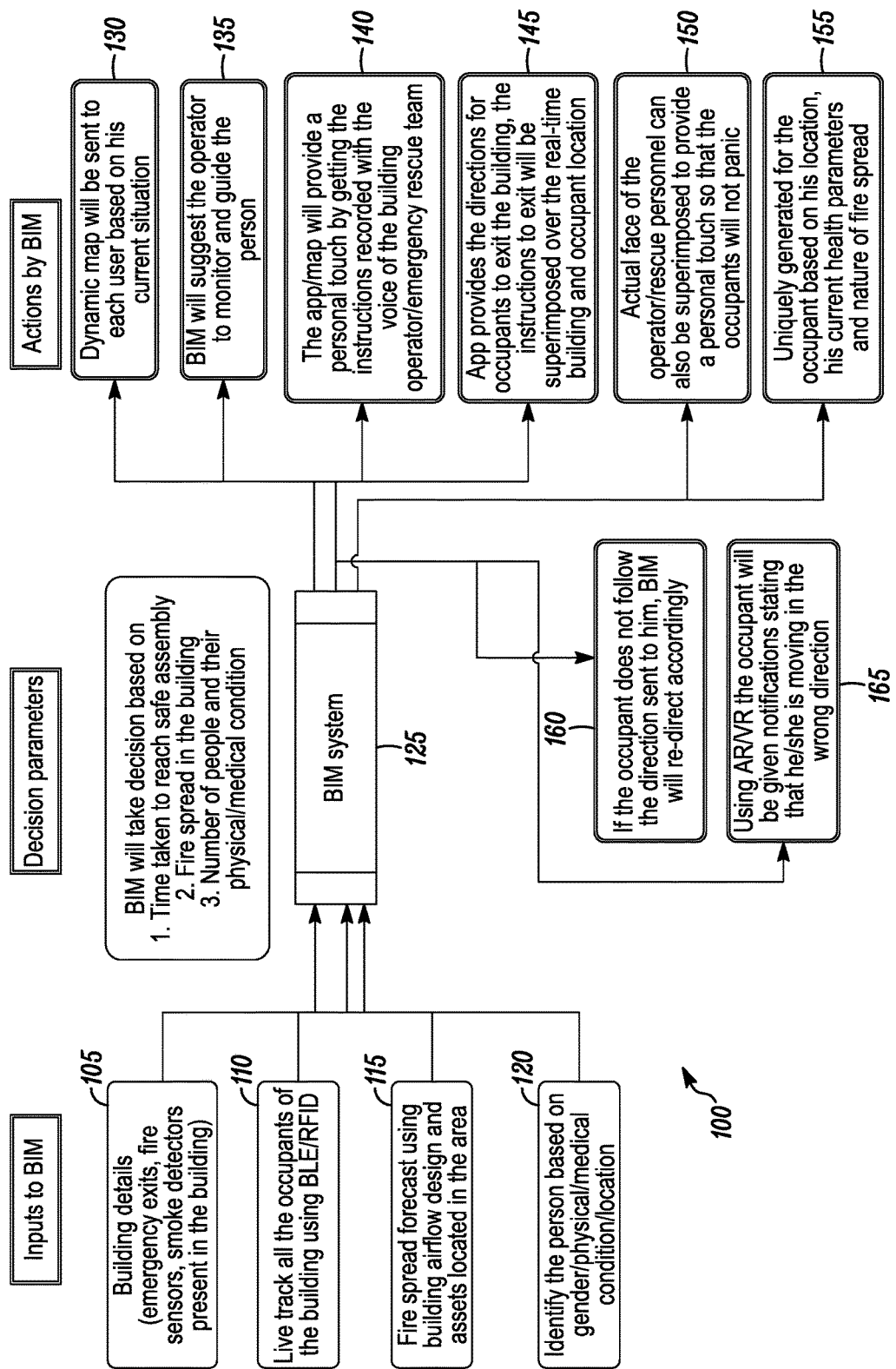

SYSTEMS AND METHODS FOR INTERACTIVE EMERGENCY RESPONSE SYSTEMS

FIELD

The present invention relates generally to emergency response systems. More particularly, the present invention relates to systems and methods for interactive emergency response systems.

BACKGROUND

When a fire or other emergency condition occurs in a monitored region, known emergency response systems detect an area in the monitored region where the fire or other emergency condition is or was located and use a public address system, manual call point, or fire alarm to notify occupants in the monitored region about the fire or other emergency condition. The occupants can then exit the monitored region using a nearest fire exit and move to a safe assembly area, and an emergency response team can enter the monitored region to take over and lead evacuation of the occupants from the monitored region. However, when any of the occupants is injured and unable to evacuate the monitored region, known emergency response systems cannot identify those occupants. Indeed, an injured occupant must contact another known person to solicit the emergency response team moving to a location of the injured occupant and moving the injured occupant to the safe assembly area.

In known systems and methods, when the monitored region is densely populated, the occupants can follow one another to exit the monitored region and move to the safe assembly area. Similarly, when the monitored region is sparsely populated, the occupants can follow signs posted in the monitored region to exit the monitored region and move to the safe assembly area or can receive a map or directions on their mobile devices to guide them out of the monitored region and to the safe assembly area. However, such known systems and methods have several disadvantages. For example, the emergency response team has no real time data to indicate current locations of the occupants. Furthermore, the occupants may not follow the signs, map, or directions correctly, and there are no know systems and methods to redirect the occupants to a correct path. Indeed, the fire or other emergency condition with characteristics of high temperature, smoke, light, or a threat of death can create an environment of stress and fear that leads the occupants to panic or that prevents the occupants from thinking and acting properly, thereby making the occupants more likely to move in a wrong direction.

In view of the above, there is a continuing, ongoing need for improved systems and methods.

BRIEF DESCRIPTION OF THE DRAWINGS

FIG. 1 is a block diagram of a method in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for interactive emergency response systems. For example, in accordance with disclosed embodiments, systems and methods disclosed herein can receive real time data that indicates a current health condition of an occupant and a current location of the occupant in a monitored region, can dynamically generate and update an evacuation plan for the occupant based on the real time data, and can dynamically transmit a notification of the evacuation plan as updated to the occupant for use in exiting the monitored region and moving to a safe assembly area. It is to be understood that the evacuation plan can include a path for the occupant to traverse from the current location of the occupant to the safe assembly area.

In some embodiments, systems and methods disclosed herein can generate the evacuation plan and transmit the notification based on a level of assistance that is required by the occupant, and the current location and the current heath condition of the occupant can be indicative of the level of assistance that is required. Accordingly, in some embodiments, the evacuation plan can be uniquely generated for the occupant based on the current location and the current health condition of the occupant. For example, when the current location indicates that the occupant is proximate to the safe assembly area or the current health condition indicates that the occupant is uninjured, systems and methods disclosed herein can determine that the occupant requires a low level of assistance, generate the evacuation plan with basic directions for exiting the monitored region and moving to the safe assembly area, and transmit no notification to the occupant or the notification with a basic communication signal, such as an email, text message, or audio file displaying or announcing the basic directions. However, when the current location indicates that the occupant is at least a predetermined distance from the safe assembly area or the real time data indicates that the occupant is injured, sick, confused, unclear on the path of the evacuation plan to reach the safe assembly area, or unable to judge the path of the evacuation plan to reach the safe assembly area, systems and methods disclosed herein can determine that the occupant requires a high level of assistance, generate the evacuation plan to provide detailed directions for exiting the monitored region and moving to the safe assembly area that take into account the current location and the current health condition of the occupant and a travel time for the occupant to move from the current location to the safe assembly area, and push or transmit the notification with an advanced communication signal.

In some embodiments, the advanced communication signal can include more detailed directions than the basic communication signal. For example, in some embodiments, the advanced communication signal can include a visual file that instructs a user device carried by the occupant to display a real time map of the monitored region with directions in the evacuation plan illustrated or superimposed thereon in real time and as updated, thereby providing augmented virtual reality. Additionally or alternatively, in some embodiments, the advanced communication signal can include an audio file that instructs a microphone on the user device carried by the occupant to emit a voice of an operator verbally instructing the occupant as to the directions in the evacuation plan in real time and as updated. Additionally or alternatively, in some embodiments, the advanced communication signal can include an audio/visual file that instructs a light source, such as a flashlight on the user device carried by the occupant, to project a face of the operator and that instructs the microphone to emit the voice of the operator verbally instructing the occupant. In some embodiments, systems and methods disclosed herein can include a virtual reality headset that can be worn by the operator when guiding the occupant out of the monitored region and to the safe assembly area.

In some embodiments, systems and methods disclosed herein can access a building information model (BIM) stored in a database device and can receive the real time data from the user device to track the occupant in the monitored region, that is, to identify the current location of the occupant, and to identify the current health condition of the occupant. For example, the BIM can identify all relevant information of the monitored region, including locations of exits from the monitored region, locations of sensors and detectors in the monitored region, and locations of paths to traverse the monitored region. Furthermore, in some embodiments, the user device can include a wearable device or a mobile device carried by the occupant, and systems and methods disclosed herein can use location signals from the user device and RFID technology, BLE-based tracking technology, or any other indoor positioning system as would be known by one of ordinary skill in the art to track the occupant.

When a fire or other emergency condition occurs in the monitored region, systems and methods disclosed herein can use the BIM to identify the safe assembly area. For example, the safe assembly area can be predetermined in the BIM, or the safe assembly area can be identified based on real time ambient condition signals received from a plurality of devices in the monitored region that identify current conditions and locations of the fire or other emergency condition in the monitored region. Then, systems and methods disclosed herein can use the BIM to identify one or more paths to reach the safe assembly area based on a plurality of parameters, such as the travel time to traverse each of the paths, a likelihood of the fire or other emergency condition spreading through each of the paths, a number of occupants in the monitored region, and the occupant's likelihood to access the safe assembly area. Then, systems and methods disclosed herein can dynamically generate and update the evacuation plan for the occupant based on the real time data and the one or more paths and can push the evacuation plan to the occupant by dynamically transmitting the notification of the evacuation plan as updated to the occupant for use in exiting the monitored region and moving to the safe assembly area. Accordingly, in some embodiments, the evacuation plan to the safe assembly area can be uniquely generated for the occupant based on the current location and the current health condition of the occupant and a nature of the fire or other emergency condition and a spread thereof.

As systems and methods receive the real time data from the user device and use the real time data to identify the current location of the occupant and track the occupant in the monitored region, systems and methods disclosed herein can simultaneously use the current health condition of the occupant to determine whether the occupant needs assistance with exiting the monitored region, such as when the current location indicates that the occupant is at least a predetermined distance from the safe assembly area or the real time data indicates that the occupant is injured, sick, confused, unclear on the path of the evacuation plan to reach the safe assembly area, or unable to judge the path of the evacuation plan to reach the safe assembly area. For example, when the real time data indicates that the occupant is moving away from the safe assembly area, not following the evacuation plan, or in a condition hindering the occupant's ability to move, systems and methods disclosed herein can determine that the occupant needs assistance with exiting the monitored region. When systems and methods determine that the occupant needs assistance with exiting the monitored region, systems and methods disclosed herein can dynamically generate or update the evacuation plan for the occupant based on the real time data and/or can push the evacuation plan to the occupant by dynamically transmitting the notification of the evacuation plan as updated to the occupant for use in exiting the monitored region and moving to the safe assembly area. For example, when systems and method determine that that occupant is not following the evacuation plan, systems and methods disclosed herein can notify the occupant in real time as to a wrong turn or a wrong direction.

Systems and methods disclosed herein are described in connection with a single occupant. However, it is to be understood that systems and methods disclosed herein are not so limited, can be used in connection with a plurality of occupants in the monitored region, and can dynamically generate or update a respective evacuation plan for each of the plurality of occupants based on respective real time data and/or can push the respective evacuation plan to each of the plurality of occupants by dynamically transmitting a respective notification of the respective evacuation plan as updated to each of the plurality of occupants for use in exiting the monitored region and moving to the safe assembly area.

It is to be understood that the systems and methods as disclosed herein can be implemented with a transceiver device and a memory device, each of which can be in communication with control circuitry, one or more programmable processors, and executable control software as would be understood by one of ordinary skill in the art. In some embodiments, the memory device can store the BIM, and in some embodiments, the transceiver device can communicate with the user device carried by the occupant to receive the real time data that indicates the current health condition of the occupant and the current location of the occupant in the monitored region, can communicate with the user device to dynamically transmit the notification of the evacuation plan as updated to the occupant for use in exiting the monitored region and moving to the safe assembly area, and can receive the real time ambient condition signals from the plurality of devices in the monitored region that identify the current conditions and locations of the fire or other emergency condition in the monitored region. In some embodiments, the executable control software can be stored on a transitory or non-transitory computer readable medium, including, but not limited to local computer memory, RAM, optical storage media, magnetic storage media, flash memory, and the like, and some or all of the control circuitry, the programmable processor, and the control software can execute and control at least some of the methods described herein. For example, in some embodiments, the control circuitry, the programmable processor, and the executable control software can dynamically generate and update the evacuation plan for the occupant based on the real time data, the real time ambient condition signals, and the BIM.

FIG. 1 is a block diagram of a method 100 in accordance with disclosed embodiments. As seen in FIG. 1, the method 100 can include receiving BIM data as in 105, receiving location data of an occupant in a monitored region as in 110, receiving ambient condition signals indicative of ambient conditions in the monitored region as in 115, and receiving health condition data for the occupant in the monitored region as in 120. Then, the method 100 can include dynamically generating an evacuation plan for the occupant based on the BIM data, the location data, the ambient condition signals, and the health condition data as in 125.

As seen in FIG. 1, the method 100 can also include one or more of transmitting a map of the monitored region illustrating the evacuation plan to the occupant as in 130, soliciting guidance from an operator as in 135, transmitting verbal directions in the evacuation plan recorded by the operator to the occupant as in 140, superimposing visual directions in the evacuation plan on the map of the monitored region as in 145, transmitting a visual image of a face of the operator to the occupant as in 150, updating the evacuation plan for the occupant based on the location data, the ambient condition signals, and the health condition as in 155, redirecting the occupant when the occupant fails to follow the evacuation plan as in 160, and notifying the occupant when the occupant moves in a wrong direction relative to the evacuation plan as in 165.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
receiving real time data related to an occupant in a monitored region, wherein the real time data includes a current location of the occupant in the monitored region and a current health condition of the occupant;
based on the real time data, identifying a first or second level of assistance required by the occupant to exit the monitored region, wherein the first level of assistance is required by the occupant to exit the monitored region when the current location is proximate a safe assembly area and when the current health condition indicates that the occupant is uninjured, and wherein the second level of assistance is required by the occupant to exit the monitored region when the current location is at least a predetermined distance from a safe assembly area, when the current location indicates the occupant is moving away from the safe assembly area, and when the current health condition indicates that the occupant is injured or sick;
based on the real time data, dynamically generating and updating an evacuation plan for the occupant from the monitored region; and
dynamically transmitting a notification of the evacuation plan as updated to a user device carried by the occupant for use in exiting the monitored region and moving to the safe assembly area.

2. The method of claim 1 further comprising:
transmitting the notification via a first communication signal when the first level of assistance is required; and transmitting the notification via a second communication signal when the second level of assistance is required.

3. The method of claim 2 further comprising:
wherein the first communication signal includes an email, a text message, or an audio file displaying or announcing basic directions in the evacuation plan.

4. The method of claim 2 further comprising:
wherein the second communication signal includes a visual file that instructs the user device to display a real time map of the monitored region with directions in the evacuation plan illustrated or superimposed thereon, an audio file that instructs a microphone of the user device to emit a voice of an operator verbally instructing the occupant as to the directions in the evacuation plan, or an audio/visual file that instructs a light source of the user device to project a face of the operator and instructs the microphone to emit the voice of the operator verbally instructing the occupant as to the directions in the evacuation plan.

5. The method of claim 1 further comprising dynamically generating and updating the evacuation plan based on a travel time for the occupant to move from the current location to the safe assembly area.

6. The method of claim 1 further comprising identifying the occupant making a wrong turn, moving in a wrong direction, or failing to follow the evacuation plan and, responsive thereto, notifying the occupant in real time of the wrong turn, the wrong direction, or a failure to follow the evacuation plan.

7. A method comprising:
retrieving a building information model of a monitored region stored in a database device;
receiving real time data related to an occupant in the monitored region, wherein the real time data includes a current location of the occupant in the monitored region and a current health condition of the occupant;
based on the real time data, identifying a first or second level of assistance required by the occupant to exit the monitored region, wherein the first level of assistance is required by the occupant to exit the monitored region when the current location is proximate the safe assembly area and when the current health condition indicates that the occupant is uninjured, and wherein the second level of assistance is required by the occupant to exit the monitored region when the current location is at least a predetermined distance from a safe assembly area, when the current location indicates the occupant is moving away from the safe assembly area, and when the current health condition indicates that the occupant is injured or sick;
based on the building information model and the real time data, dynamically generating and updating an evacuation plan for the occupant from the monitored region; and
dynamically transmitting a notification of the evacuation plan as updated to a user device carried by the occupant for use in exiting the monitored region and moving to the safe assembly area.

8. The method of claim 7 further comprising identifying the safe assembly area based on the building information model.

9. The method of claim 8 further comprising:
receiving real time ambient condition signals from a plurality of devices in the monitored region that identify current conditions in the monitored region; and
identifying the safe assembly area based on the real time ambient condition signals.

10. The method of claim 9 further comprising dynamically generating and updating the evacuation plan based on the real time ambient condition signals.

11. The method of claim 7 further comprising identifying the occupant making a wrong turn, moving in a wrong direction, or failing to follow the evacuation plan and, responsive thereto, notifying the occupant in real time of the wrong turn, the wrong direction, or a failure to follow the evacuation plan.

12. The method of claim 7 further comprising:
    transmitting the notification via a first communication signal when the first level of assistance is required; and
    transmitting the notification via a second communication signal when the second level of assistance is required.

13. The method of claim 12 further comprising:
    wherein the first communication signal includes an email, a text message, or an audio file displaying or announcing basic directions in the evacuation plan.

14. The method of claim 12 further comprising:
    wherein the second communication signal includes a visual file that instructs the user device to display a real time map of the monitored region with directions in the evacuation plan illustrated or superimposed thereon, an audio file that instructs a microphone of the user device to emit a voice of an operator verbally instructing the occupant as to the directions in the evacuation plan, or an audio/visual file that instructs a light source of the user device to project a face of the operator and instructs the microphone to emit the voice of the operator verbally instructing the occupant as to the directions in the evacuation plan.

15. The method of claim 7 further comprising dynamically generating and updating the evacuation plan based on a travel time for the occupant to move from the current location to the safe assembly area.

* * * * *